United States Patent [19]
Schneider et al.

[11] Patent Number: 4,565,672
[45] Date of Patent: Jan. 21, 1986

[54] METHOD FOR THE MANUFACTURE OF PUO$_2$-CONTAINING CRYSTALS

[75] Inventors: Volker Schneider, Heusenstamm; Wolfgang Stoll, Hanau; Wolf-Günther Druckenbrodt, Rodenbach, all of Fed. Rep. of Germany

[73] Assignee: Alkem GmbH, Hanau, Fed. Rep. of Germany

[21] Appl. No.: 556,638

[22] Filed: Nov. 30, 1983

[30] Foreign Application Priority Data

Dec. 6, 1982 [DE] Fed. Rep. of Germany ....... 3245051

[51] Int. Cl.$^4$ ............................................. C01G 56/00
[52] U.S. Cl. ...................................... 423/15; 423/251
[58] Field of Search .................................. 423/15, 251

[56] References Cited

U.S. PATENT DOCUMENTS

| | | | |
|---|---|---|---|
| 2,823,978 | 2/1958 | Sutton | 423/251 |
| 2,867,640 | 1/1959 | Gotman | 423/251 |
| 2,871,251 | 1/1959 | Gotman et al. | 423/15 |
| 2,892,678 | 6/1959 | Thompson et al. | 423/251 |
| 2,894,812 | 7/1959 | Duffield | 423/251 |
| 3,372,999 | 3/1968 | Stevenson | 423/15 |
| 3,790,658 | 2/1974 | Fox et al. | 423/15 |
| 4,235,740 | 11/1980 | Druckenbrodt et al. | 423/251 |

FOREIGN PATENT DOCUMENTS

1920301  12/1970  Fed. Rep. of Germany ........ 423/15

OTHER PUBLICATIONS

Russell, *J. Inorg. Nucl. Chem.*, 36 (#7), 1659–1660, (Jul. 1974).

*Primary Examiner*—Edward A. Miller
*Attorney, Agent, or Firm*—Herbert L. Lerner; Laurence A. Greenberg

[57] ABSTRACT

A method for manufacturing Pu$_2$-containing crystals by oxidizing plutonium in a heavily contaminated nitric acid starting solution to Pu$^{6+}$, precipitating ammonium plutonyl carbonate containing crystals by reaction with ammonium- and carbonate ions and subsequent separating and calcining of these crystals. The nitric acid solution with the oxidized Pu$^{6+}$ as well as carbonate and/or acetate ions and NH$^3$ are dosed into an aqueous starting solution of ammonium carbonate or ammonium acetate in a concentration such that the mol ratio of carbonate and/or acetate ions to the Pu$^{6+}$-ions in the solution is at least 4:1 and plutonium containing carbonato- or acetato complex compounds whch remain dissolved in the receiver solution, are formed, while difficult-to-dissolve metal hydroxide compounds are precipitated. Thereupon NH$^3$ and carbonate ions are added to precipitate the ammonium plutonyl carbonate containing crystals.

4 Claims, 1 Drawing Figure

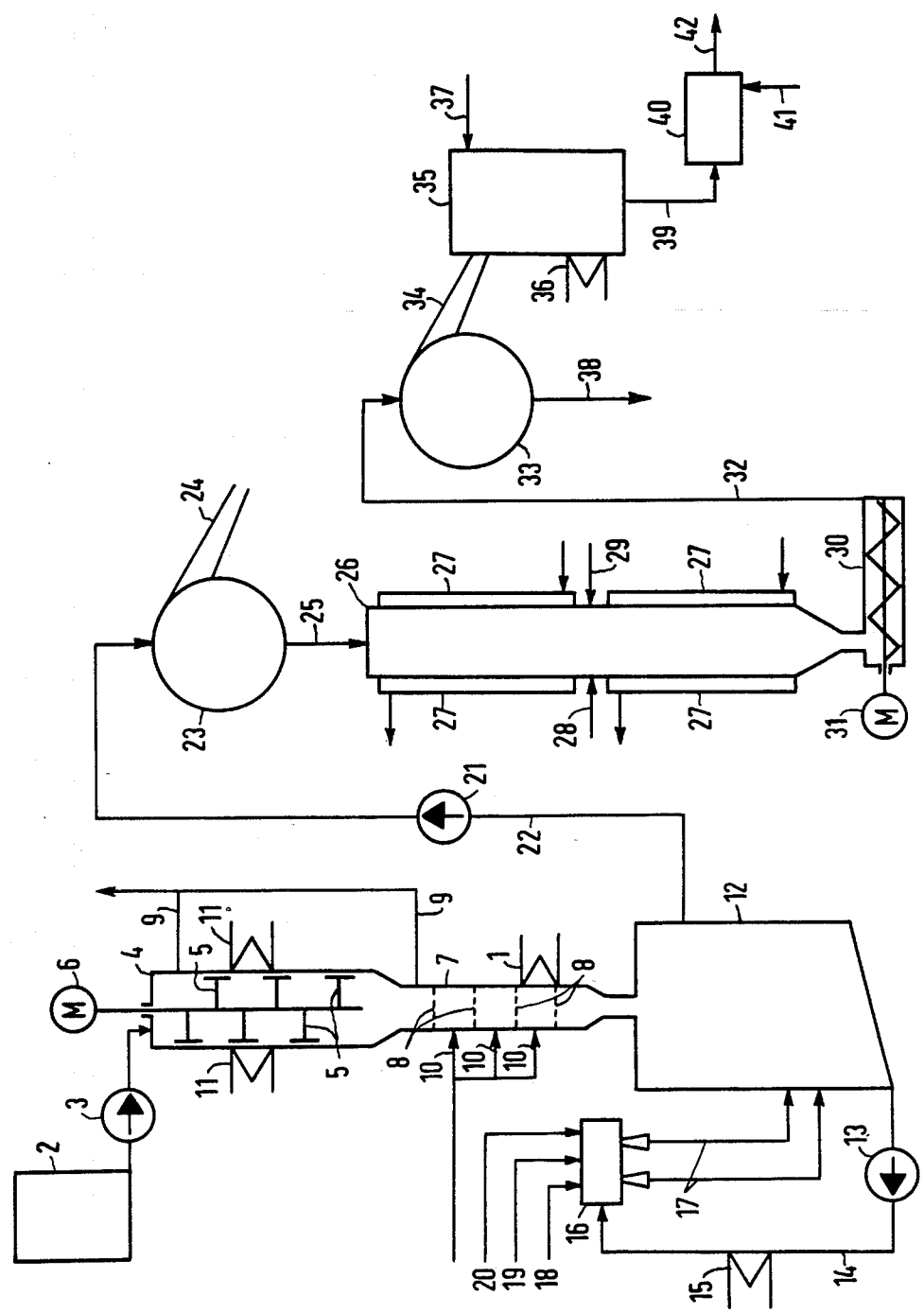

METHOD FOR THE MANUFACTURE OF PUO₂-CONTAINING CRYSTALS

BACKGROUND OF THE INVENTION

1. Field of the Invention

The invention relates to a method for the manufacture of $PuO_2$-containing crystals by oxidation of plutonium in a nitric-acid starting solution to form $Pu^{6+}$, precipitation of ammonium plutonyl carbonate-containing crystals through reaction with ammonium and carbonate ions, and subsequent separation and calcination of these crystals.

2. Description of the Prior Art

A method of this type is known from German Pat. No. 28 11 959, (U.S. Pat. No. 4,235,740). According to the patent, a nitric acid uranyl nitrate solution and a nitric acid plutonium nitrate solution are mixed. The plutonium in this solution mixture is oxidized to the valence stage 6 by heating and concentrating. Ammonium carbonate, ammonia and carbon dioxide are added in another vessel to the concentrated solution in dilute nitric acid. As a result of reaction with the ammonium carbonate ions there is produced ammonium uranyl plutonyl carbonate which is precipitated in crystal form. This ammonium uranyl plutonyl carbonate is filtered off, dried and calcined by heating it to about 600° C. The calcined U/$PuO_2$ product is in the form of mixed crystals which can be processed further into nuclear fuel for nuclear reactor fuel assemblies.

SUMMARY OF THE INVENTION

It is an object of the invention to further develop the known method and to make it applicable also to heavily contaminated nitric-acid starting solutions with metal compound impurities which precipitate with the ammonium uranyl plutonyl carbonate.

With the foregoing and other objects in view there is provided in accordance with the invention a method for the manufacture of $PuO_2$-containing crystals by oxidizing plutonium in a nitric acid solution to form $Pu^{6+}$, precipitation of ammonium plutonyl carbonate containing crystals through reaction with ammonium and carbonate ions and subsequent separation and calcining of these crystals, the improvement comprising removing metal compound contaminents in the nitric acid solution which form difficult-to-dissolve metal hydroxide compounds by introducing the oxidized $Pu^{6+}$ in solution in nitric acid into an aqueous solution of a salt selected from the group consisting of ammonium carbonate and ammonium acetate, dosing said aqueous solution with $NH_3$ and acid ions selected from the group consisting of carbonate ($CO_3^{-2}$) ions and acetate ($CH_3COO^-$) ions to produce a mol ratio of acid ions to the $Pu^{6+}$ ions in said aqueous solution of at least 4:1, said acid ions forming complex compounds containing plutonium which remain dissolved in the aqueous solution, while the metal compound contaminants convert to difficult-to-dissolve metal hydroxide compounds and are precipitated, separating the precipitated metal hydroxide compounds from the aqueous solution, and thereafter adding $NH_3$ and carbonate ions to effect precipitation of the ammonium plutonyl carbonate containing crystals.

Other features which are considered as characteristic for the invention are set forth in the appended claims.

Although the invention is illustrated and described herein as embodied in a method for the manufacture of $PuO_2$-containing crystals, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates in simplified form apparatus for carrying out the method of the invention. It will be noted that the nitric acid solution containing $Pu^{6+}$ is admixed with a body of an aqueous solution of ammonium carbonate or acetate which is dosed with carbonate and/or acetate ions and $NH_3$ to form a complex compound containing plutonium which remains in solution. Metal impurities in the solution form hydroxides which are difficult to dissolve and precipitate out. The precipitate is centrifuged off and the liquor dosed with $NH_3$ and $CO_2$ to precipitate ammonium plutonyl carbonate containing crystals which are separated from the liquor.

DETAILED DESCRIPTION OF THE INVENTION

According to the invention, in a method of the type mentioned at the outset, the nitric-acid solution with the oxidized-up $Pu^{6+}$ as well as carbonate ($CO_3^{2-}$) and/or acetate ($CH_3COO^-$) ions and $NH_3$ are dosed into an aqueous starting solution of ammonium carbonate and/or ammonium acetate in a concentration to produce a resultant solution in which the mol ratio of carbonate and/or acetate ions to the $Pu^{6+}$-ions is at least 4:1. Plutonium-containing carbonate- or acetato complex compound which remain dissolved in the solution are formed at the mol ratio of 4:1 and above, while difficult-to-dissolve metal hydroxide compounds are precipitated. The precipitated metal hydroxide compounds are separated. Thereupon sufficient $NH_3$ and carbonate ions are added to the solution separated from the metal hydroxide compounds, to effect precipitation of the ammonium-plutonyl carbonate-containing crystals.

The invention starts out from the insight that plutonium as well as uranium in their 6-valent oxidation stage are capable of forming soluble carbonato- and acetato complex compounds. Salts of a number of metals other than uranium or plutonium, such as accumulate in reprocessing of nuclear reactor fuel assemblies, are frequently contained as impurities in nitric acid starting solutions of plutonium. These metal impurities do not form soluble complex compounds with carbonate and acetate ions, and these metals are therefore precipitated at a pH of the solution in which the soluble complex compounds are formed.

Salts of other metals, on the other hand, will precipitate and not remain in solution, not only at this $pH$, but also in the subsequent precipitation of the ammonium plutonyl carbonate-containing crystals at an increased pH-value, and are separated by this subsequent precipitation step.

The invention and its advantages will be explained in greater detail with the aid of an embodiment example, referring to the drawing:

A plant for implementing the method according to the invention is shown schematically in the drawing. This plant has a supply tank 2, containing feed solution which is withdrawn by a conveyor pump 3 and fed to a thin film evaporator 4. Wipers 5 are arranged vertically on top of each other in this thin-film evaporator 4. The wipers 5 are set in rotation about the vertical longitudinal axis of the thin-film evaporator 4 by means of an electric motor 6 which causes distribution of the liquid solution charged in at the top into the thin-film evaporator 4 as a fine surface film in the inside wall of the thin-film evaporator 4.

A hollow cylindrical bubble column 7 is flanged-on at the lower end of the thin-film evaporator 4. Column 7 contains a plurality of horizontal spaced bubble-caps or sieve plates 8 arranged vertically on top of each other. An outlet 9 for the discharge of distilled-off nitric acid is provided at the upper end of the thin-film evaporator 4 and at the top end of the bubble column 7. A feed line 10 for introduction of concentrated nitric acid above each sieve plate 8 in the bubble column 7 leads into the bubble column 7.

The thin-film evaporator 4 as well as the bubble column 7 can be heated by means of electric heating devices 11 and 1 which devices are attached on the outside of column 7 and evaporator 4.

The bubble column 7 is placed with its lower end opening into a subsequent reaction vessel 12. Circulation of the contents in vessel 12 can be effected by means of a circulating line 14 equipped with a feed pump 13 connected to the bottom of vessel 12. This circulating line 14 can be heated by an electric heating device 15. Line 14 discharges into a mixing device 16 designed, for instance, as a nozzle box, which device 16 is connected to return lines 17 leading back to the reaction vessel 12. The mixing device 16 has feed lines 18, 19 and 20 for introduction of $H_2O$, $NH_3$ and $CO_2$ or ammonium acetate.

The reaction mixture in the reaction vessel 12 is an aqueous solution having solids suspended therein. The suspension is withdrawn from vessel 12 through line 22 and sent by conveyor pump 21 to a centrifuge 23 wherein the solids in the suspension are separated from the liquid and removed through a discharge stub 24. The separated liquid in the centrifuge 23 flows through a discharge stub 25 to a precipitation tank 26. Cooling tubes 27 are arranged at the outer cylinder surface of tank 26. Cooling water flows through tubes 27, upwardly countercurrent to the downward flow of liquid in tank 26. The precipitation tank 26 further has a feed stub 28 for $NH_3$ and a feed stub 29 for $CO_2$ for introduction of these gases into tank 26.

The lower end of the precipitation tank 26 is connected to a suspension pump 30 with an electric drive motor 31, which forces the suspension of solids in liquid at the bottom of precipitation tank 26 through suspension line 32 into centrifuge 33. The solids separated in centrifuge 33 discharge through solids discharge 34 into a calcining furnace 35 which is equipped with a electric heating device 36 and with a feed stub 37 for introducing reducing gas consisting of 96% $N_2$ and 4% $H_2$. The centrifuge 33 is further provided with a mother liquor discharge 38. The calcining furnace 35 further has a powder discharge 39, with which an electrically heatable valence-setting device 40 with an air feeding stub 41 is associated. Uranium-plutonium mixed-oxide power is discharged from valence-setting device 40 through line 42.

The supply tank 2 contains a starting solution of nitric acid in which uranyl nitrate $UO_2(NO_3)_2$ and plutonium nitrate $Pu(NO_3)_2$ are dissolved. The solution is heavily contaminated with metal ions, such as is produced, for instance, in the reprocessing of spent nuclear reactor fuel or in processing nuclear reactor fuel. This solution containing metal ion impurities other than uranium and plutonium is fed from supply tank 2 by the feed pump 3 into the top of thin-film evaporator 4, through which it runs downwardly. In the process, the wipers 5 are set in rotation by the electric motor 6 and the thin-film evaporator 4 is heated by the electric heating devices 11.

Since the solution is distributed in the thin-film evaporator to form a thin surface layer, the residence time of the solution in the thin-film evaporator 4 need be only a few seconds to increase the concentration of the uranium and the plutonium to about 1000 g per liter. Polymerization of the plutonium due to local overheating of the solution and lack of acid will not occur in this-film evaporator 4 due to the short time of contact of the film with the hot wall, usually less than one minute. The thus concentrated solution flows from the bottom of evaporator 4 directly into the top of bubble column 7, through which it also flows downwardly. In the bubble column 7, the plutonium is oxidized to $Pu^{6+}$ in the presence of concentrated nitric acid at a temperature of 150° C. and a reaction pressure of 1 bar. Free nitric acid is drawn off from the top of bubble column 7 through line 9, leaving a liquid melted uranyl-plutonyl nitrate salt which drips down from the bottom of bubble column 7 directly into the reaction vessel 12, which contains an aqueous starting receiver solution of the ammonium carbonate and-/or ammonium acetate.

The liquid contained in the reaction vessel 12 is circulated continuously by means of the circulating pump 13 via the circulating line 14, through the mixing device 16 and the feed lines 17 and heated by the electric heating device 15. In the mixing device 16, water is fed to the circulating liquid through the feed line 18, ammonia through the feed line 19 and carbon dioxide $CO_2$ through the feed line 20 if the starting input solution contains ammonium carbonate. Solid ammonium acetate is fed through line 20 if the starting solution contains ammonium acetate. A pH-value in the range of 7 to 8 is maintained in the input solution by means of the ammonia fed-in via the feed line 19. As a result of feeding-in the $CO_2$ or ammonium acetate, carbonate ions $CO_3^{2-}$ and acetate ions $CH_3COO^-$, respectively, are formed in the solution in the reaction vessel 12. The amount of $CO_2$ or ammonium acetate fed-in is sufficient to provide a mol ratio of carbonate and/or acetate ions to the $Pu^{6+}$-ions in the receiver solution of at least 4:1 and preferably 6:1.

Generally, this mol ratio should increase with higher uranyl ion concentration in the nitric acid starting solution. For complexing a uranyl ion, as many carbonate and/or acetate ions are required as for complexing a plutonyl ion.

The supply of uranyl-plutonyl nitrate from the bubble column 7 and of water through the feed line 18 into the reaction vessel 12 can advantageously be adjusted to obtain a uranium/plutonium concentration of about 200 g per liter.

Due to the high carbonate or acetate ion concentration in the reaction vessel 12, uranium and plutonium remain in solution there as carbonato- or acetato complex compounds. Other metal ions form difficult-to-dissolve hydroxide compounds and are precipitated in the solution in the reaction vessel 12.

The suspension thus formed of difficult-to-dissolve metal hydroxide compounds in the solution in the reaction vessel 12 is pumped by the feed pump 21 through the suspension line 22 to the centrifuge 23, in which the precipitated metal hydroxide compounds are centrifuged off and are discharged through the discharge stub 24.

The clear mother liquor from the centrifuge 23 is fed through line 25 into the precipitation tank 26, in which its temperature is lowered by means of cooling water flowing through tubes 27 to 20° C. at a pressure of 1 bar. he flow of $NH_3$ and $CO_2$ through the feed stubs 28 and 29 is chosen to increase the pHvalue of the mother solution to 8 to 10 and preferably to 8.4 to 8.6. 99% by weight of the dissolved uranium and plutonium are precipitated as ammonium uranyl plutonyl carbonate $(NH_4)U/PuO_2(CO_3)_3$. This happens if mol concentration of ammonium carbonate in the mother solution is about 3 to 4.

The resulting suspension is pumped from precipitation tank 2 by the suspension pump 30 driven by the electric motor 31 through the feed line 32 to the centrifuge 33, in which the centrifuged-off ammonium uranyl plutonyl carbonate is discharged through the solids discharge stub 4 into the calcining furnace 35. The ammonium uranyl plutonyl carbonate in furnace 35 is reduced to $U/PuO_2$-powder by heating to temperatures of about 600° to 900° C. in the presence of a reducing gas. The reducing gas entering calcining furnace 35 through line 37 may consist of a mixture of nitrogen and hydrogen with 4% by volume hydrogen.

The $U/PuO_2$-powder is conducted through the discharge line 39 from the calcining furnace 35 to the valence-adjusting device 40, in which a predetermined $U/Pu : O$ ratio is set by heating in the presence of air. Uranium-plutonium mixed-oxide powder discharged from the valence-setting device 40 through the discharge stub 42 is available for further processing into nuclear reactor fuel assemblies.

Contaminating metal ions which possibly can be still present in small amounts in dissolved form in the suspension fed to the centrifuge 33, remain in dissolved form in the mother liquor discharged from the centrifuge 33 through the mother liquor discharge 38 and thus do not get into the ammonium uranyl plutonyl carbonate solids centrifuged-off in the centrifuge 33. It is advantageous to include sufficient ethylenediamine tetraacetic acid as a cation complex former in the solution in the precipitation tank 26, to avoid formation of colloids of metal compounds in the solution in the precipitation tank 26, without adverse effects on the ammonium uranyl plutonyl carbonate precipitation.

The method according to the invention is particularly suitable for a continuous process. It has an inherent purification action on the product of the process without the need to use combustible reaction partners. In spite of this, the method according to the invention permits the use of starting solutions which are heavily contaminated, for instance, with metallic nuclear fission products without adversely affecting the purity of the product of the process.

The effectiveness of removal of contaminants is illustrated by the following:

One liter uranyl-plutonyl-nitrate starting solution filled as a reference amount into the supply tank 2 contains 150 g uranium and 100 g plutonium, and also contaminents of 10 g aluminum, 5 g americium, 10 g iron, 10 g chromium and 20 g nickel in 1 molar $HNO_3$. Referring to this reference quantity of 1 liter starting solution with reference to the ammonium-carbonate containing starting solution in the reaction vessel 12, the liquid circulated through the mixing device 16 is treated with 3 mol $NH_3$ and 7 mol $CO_2$. The precipitated metal hydroxide compounds discharged from the centrifuge 23 through the discharge stub 24 contain 80% of the aluminum, 90% of the americium, 99% of the iron and 95% of the nickel of the reference quantity of 1 liter starting solution which was filled into the supply tank 2. Based on this reference quantity of 1 liter starting solution, an additional 5 mol $NH_3$ is introduced through the feed stub 28, and 1 mol $CO_2$ is introduced through feed stub 29 into the precipitation tank 26, so that the pH of the mother liquor from the centrifuge 23 is set to 8.6 in this precipitation tank. The $U/PuO_2$ powder obtained from the reference quantity of 1 liter starting solution and discharged through the discharge 39 from the calcining furnace 35 contains only, based on the sum of uranium and plutonium, 400 ppm aluminum, 400 ppm americium, 40 ppm iron, 200 ppm nickel, and 40 ppm chromium. The mother liquor discharged from the mother liquid discharge 38 from the centrifuge 33 contains 95% of the aluminum, 80% of the americium, 99.9% of the chromium, 90% of the nickel and 90% of the iron of those contaminents which are still contained in i the solution in the mother liquor which is discharged from the centrifuge 23 through the fluid discharge stub 25.

We claim:

1. In a method for the manufacture of $PuO_2$-containing crystals by oxidizing plutonium in a nitric acid solution to form $Pu^{6+}$, precipitation of ammonium plutonyl carbonate containing crystals through reaction with ammonium and carbonate ions and subsequent separation and calcining of these crystals, the improvement comprising removing metal compound contaminents in the nitric acid solution which form difficult-to-dissolve metal hydroxide compounds by introducing the oxidized $Pu^{6+}$ in solution in nitric acid into an aqueous solution of a salt selected from the group consisting of ammonium carbonate and ammonium acetate, dosing said aqueous solution with $NH_3$ and acid ions selected from the group consisting of carbonate $(CO_3^{-2})$ ions and acetate $(CH_3COO^-)$ ions to produce a mol ratio of acid ions to the $Pu^{6+}$ ions in said aqueous solution of at least 4:1, said acid ions forming complex compounds containing plutonium which remain dissolved in the aqueous solution, while the metal compound contaminants convert to difficult-to-dissolve metal hydroxide compounds and are precipitated, separating the precipitated metal hydroxide compounds from the aqueous solution, and thereafter adding $NH_3$ and carbonate ions to effect precipitation of the ammonium plutonyl carbonate containing crystals.

2. Method according to claim 1, wherein said $NH_3$ for said dosing of the aqueous solution for precipitating the metal hydroxide compounds and forming complex compounds is added in an amount to maintain the pH of the aqueous solution in the range of 7 to 8.

3. Method according to claim 1, wherein the $NH_3$, for precipitating the ammonium plutonyl carbonate containing crystals, after the precipitated metal hydroxide compounds have been separated, is added in an amount to maintain the pH of the aqueous solution in the range of above 8 to 10.

4. Method according to claim 3, wherein the pH range is from 8.4 to 8.6.

* * * * *